Aug. 28, 1945.  J. M. GWINN, JR., ET AL  2,383,854
COUNTERSINK DEVICE
Filed Sept. 25, 1944  2 Sheets-Sheet 1

Inventors
Christian L. R. Smeltzer
& Joseph M. Gwinn Jr.
By Fred Gerlach Atty.

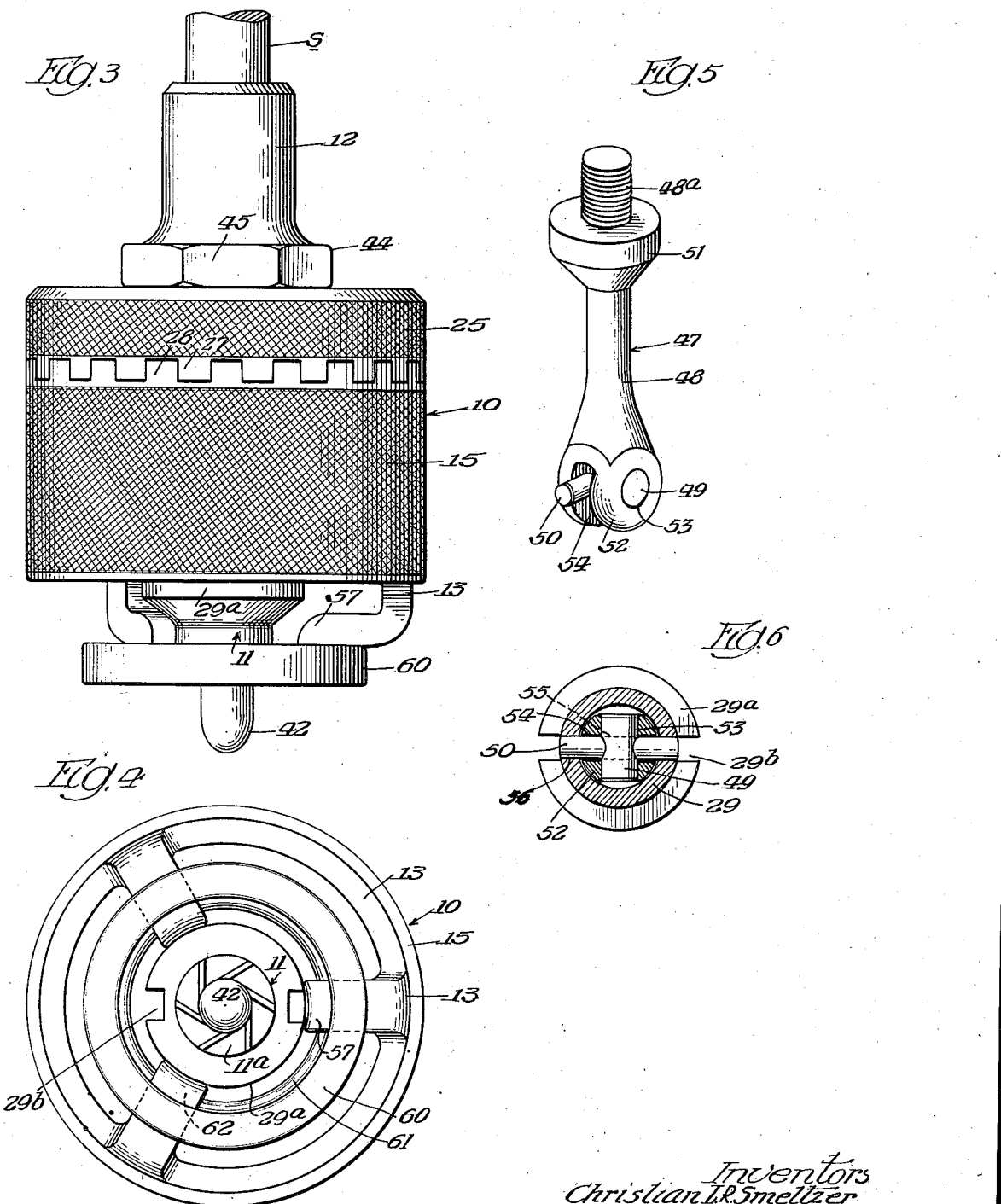

Patented Aug. 28, 1945

2,383,854

UNITED STATES PATENT OFFICE 2,383,854

COUNTERSINK DEVICE

Joseph M. Gwinn, Jr., San Diego, and Christian L. R. Smeltzer, Spring Valley, Calif., assignors to Consolidated Vultee Aircraft Corporation, San Diego, Calif., a corporation of Delaware Application September 25, 1944, Serial No. 555,652

17 Claims. (Cl. 77—73.5)

The present invention relates generally to countersink devices. More particularly the invention relates to that type of countersink device which is adapted to be driven by an electric or pneumatic motor, operates to countersink the outer ends of previously drilled holes, such, for example, as those that are formed in aircraft for the reception of rivets of the flush or flat head variety, and as its principal component parts comprises: (1) a composite tubular body in the form of inner and outer ring shaped shells; (2) a rotary countersink tool which is positioned adjacent one end of, and in axial alignment with, the body and has cutting edges for countersink forming purposes; (3) a rotary adaptor which is disposed in the other end of the tubular body, embodies means at its outer end for connection to the drive shaft of the motor, and has its inner end connected to the inner end of the countersink tool in order to drive such tool in connection with operation of the motor; and (4) a tubular spring loaded combined guide and stop member which surrounds the countersink tool, has its inner end slidably mounted between the inner and outer shells constituting the tubular body, and its outer end shaped to engage the workpiece in which the countersink is to be formed, and is adapted when the countersink tool is fed into the outer end of the previously formed hole in connection with operation or use of the device to have its outer end fit flatly against the workpiece and in addition to coact with the tubular body so as to limit the amount of feed of the tool into the outer end of the hole and thus control the depth or size of the countersink.

One object of the invention is to provide a countersink device of this type which is an improvement upon, and has certain advantages over, previously designed devices of the same general character and is characterized by the fact that it will form uniform and extremely accurate countersinks even though operated or manipulated by an unskilled operator.

Another object of the invention is to provide a countersink device of the type and character under consideration in which the adaptor is connected to the countersink tool by a universal joint with the result that it is unnecessary for the operator in connection with use of the device to hold the motor in a position wherein the axis of the drive shaft thereof is in true axial alignment with the axis of the rotary countersink tool.

Another object of the invention is to provide a countersink device of the last mentioned character in which the universal joint between the adaptor and the countersink tool is positioned immediately adjacent the cutting edges of the tool with the result that the device as a whole is extremely stable in connection with use thereof.

Another object of the invention is to provide a countersink device of the heretofore mentioned type in which the countersink tool is rotatably mounted in the tubular body in a simple and novel manner and the body has a twofold purpose in that it serves not only slidably to support the combined guide and stop member but also so to limit tilting of the adaptor relatively to the countersink tool as to prevent the adaptor from being laterally displaced to such an extent as to cause the universal joint between the adaptor and the tool to bind.

Another object of the invention is to provide a countersink device of the type and character under consideration in which the outer ring shaped shell of the composite tubular body embodies stop means for limiting sliding movement of the combined guide and stop member relatively to the body and is provided with simple and novel means whereby it is axially adjustable with respect to the inner ring shaped shell in order that the stop means thereof may be varied or shifted for the purpose of controlling the depth or size of the countersink that is made by the tool in connection with operation of the device.

A further object of the invention is to provide a countersink device of the aforementioned type in which the tubular spring-held combined guide and stop member embodies three equidistantly spaced workpiece engaging fingers which surround the operating or edge equipped end of the countersink tool and have a snap ring therearound for preventing them from entering, in connection with a countersinking operation, any holes immediately adjacent the hole being countersunk by the tool.

A still further object of the invention is to provide a countersink device which is generally of new and improved construction, may be manufactured at a comparatively low cost and effectively and efficiently fulfills its intended purpose.

Other objects of the invention and the various advantages and characteristics of the present countersink device will be apparent from a consideration of the following detailed description.

The invention consists in the several novel features which are hereinafter set forth and are more particularly defined by claims at the conclusion hereof.

In the drawings which accompanies and forms a part of this specification or disclosure and in which like letters and numerals of reference denote corresponding parts throughout the several views:

Figure 3 is a side view of the device;

Figure 4 is a bottom view;

Figure 5 is a perspective of the universal joint of the adaptor and the countersink tool; and Figure 6 is a section taken on the line 6—6 of Figure 1.

Figure 1:
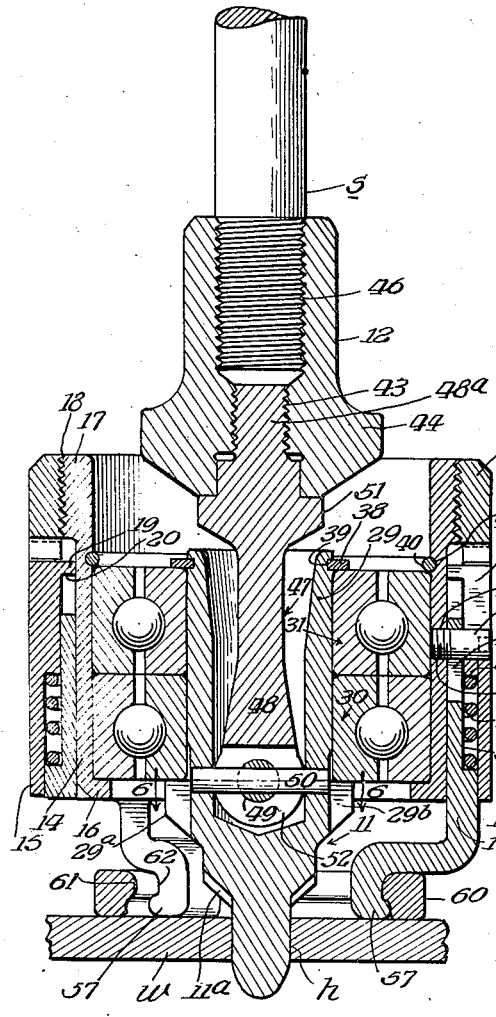
Figure 1 is a longitudinal section of a countersink device embodying the invention.
Figure 2:
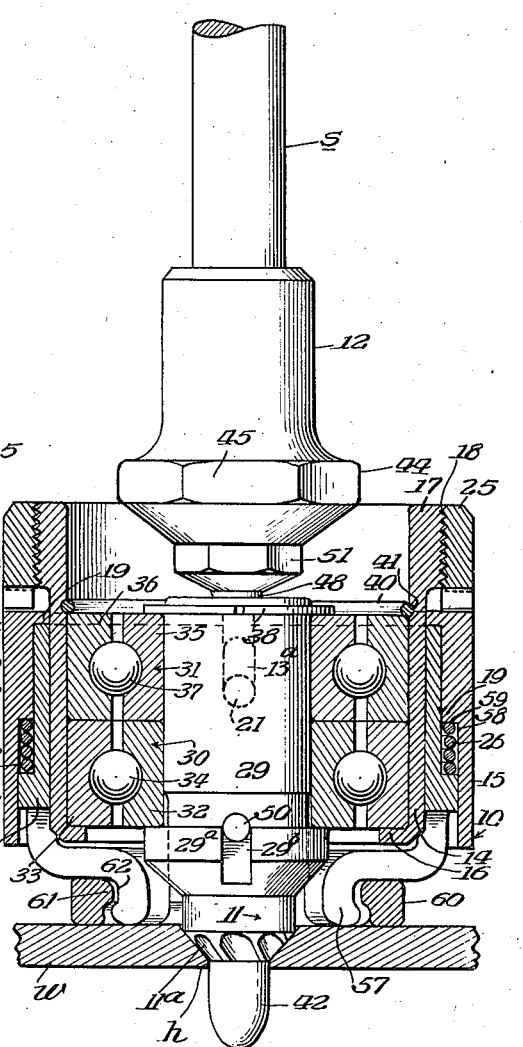
Figure 2 is a longitudinal section taken at right angles to Figure 1 and showing the device after it has been depressed in connection with a countersinking operation.

The countersink device which is shown in the drawings constitutes the preferred form or embodiment of the invention. It is illustrated in connection with a workpiece $w$ having a preformed or previously drilled hole $h$ therethrough and serves, as hereinafter described, to form a countersink in the outer end of the hole. As its principal parts the device comprises a composite tubular body 10, a rotary countersink tool 11, a rotary adaptor 12 and a tubular combined guide and stop member 13. An electric or pneumatic motor (not shown) having a drive shaft $s$ with the outer end thereof externally threaded serves to drive the adaptor and countersink tool.

The tubular member 10 of the countersink device comprises an inner ring shaped shell 14 and an outer ring shaped shell 15 and in connection with use of the device remains stationary except for shift in the direction of the workpiece $w$. For purposes of the present disclosure it will be assumed that the body 10 extends vertically in connection with use of the device. The inner ring shaped shell 14 of the body 10 embodies an integral inwardly extending annular flange 16 at its lower end and has a cylindrical inner periphery. The upper end of the inner shell 14 embodies an outwardly extending flange 17 and this is provided with an external or male screw thread 18. The outer ring shaped shell 15 of the body 10 surrounds, and is arranged in concentric relation with respect to, the inner shell and embodies at its upper end an integral inwardly extending flange 19 which is axially slidable on the outer periphery of the inner shell and is disposed beneath the outwardly extending flange 17 on the upper end of said inner shell. As shown in Figure 1, the inwardly extending flange 19 embodies a downwardly facing annular shoulder 20 which, as described hereafter, constitutes stop means for limiting axial sliding movement of the combined guide and stop member 13 relatively to the composite tubular body 10. The inner periphery of the outer shell is of greater diameter than the outer periphery of the inner shell in order to provide between the two shells an annular space, the lower end of which is open. The outer shell is held against rotative displacement with respect to the inner shell by way of a radially extending pin 21 between the two shells. This pin is disposed substantially midway between the ends of the inner shell and has at its inner end an externally threaded stem 22 which extends within an internally threaded hole 23 in the central portion of the inner shell 14. The outer end of the pin 21 projects into a longitudinally extending slot 24 in the outer shell 15. The slot 24 is located directly beneath the inwardly extending flange 19 on the upper end of the outer shell and together with the pin forms a pin and slot connection whereby the outer shell is held against rotative displacement relatively to said inner shell while at the same time it is permitted to slide axially to a limited extent with respect to said inner shell. A nut 25 is mounted on the external or male screw thread 18 on the outwardly extending flange 17 at the upper end of the inner shell 14. The lower end of this nut abuts against the inwardly extending flange 19 at the upper end of the outer shell 15. The nut constitutes means for adjusting the outer shell longitudinally in either direction with respect to the inner shell. When the nut is turned in one direction it serves downwardly to displace the outer shell and when the nut is turned in the opposite or reverse direction it permits of upward displacement of the outer shell with respect to the inner shell. The outer shell is urged upwards into abutment with the lower end of the nut 25 by a spiral compression spring 26. This spring also operates to urge downwards the tubular combined guide and stop member 13 which is located within the lower end of the outer shell 15. The lower end of the nut 25 is provided with an annular series of equidistantly spaced depending teeth 27 and the inwardly extending flange 19 at the upper end of the outer shell is provided with an annular series of equidistantly spaced upstanding teeth 28. The teeth 28 are normally in interfitting relation with the teeth 27 and prevent rotation of the nut relatively to the inner shell. When it is desired to rotate the nut in connection with longitudinal shift or adjustment of the outer shell with respect to the inner shell the outer shell is shifted downwards against the force of the spring in order to disengage the upstanding teeth 28 from the depending teeth 27. After disengagement of the upstanding teeth with respect to the depending teeth the nut 25 may be rotated in either direction to any desired position. After rotative adjustment of the nut as desired the outer shell is released so that it is urged upwards by the spring 24 into its normal position wherein its teeth 28 are in interfitting relation with the depending teeth 27 on the nut 25. When the outer shell is in its normal position wherein its inwardly extending flange 19 is in abutment with the lower end of the nut 25 the nut determines the position of the outer shell with respect to the inner shell. The outer peripheries of the nut and the outer shell are preferably knurled in order that they may be readily gripped. As hereinafter described, the annular downwardly facing shoulder 20 on the inwardly extending flange 19 constitutes stop means for limiting upward displacement of the combined guide and stop member 13 relatively to the composite tubular body 10 and thus controlling the depth or size of the countersink that is made by the rotary countersink tool 11. Since the annular shoulder 20 is longitudinally adjustable with respect to the inner shell, as heretofore described, the depth or size of the countersink may be controlled at will.

The countersink tool 11 is positioned adjacent the lower end of, and in axial alignment with, the composite tubular body 10 and embodies at the lower end thereof an annular series of equidistantly spaced downwardly and inwardly inclined cutting edges 11ª. It is driven, as hereinafter described, by the adaptor 12 and embodies above the cutting edges an upstanding integral sleeve-like part 29. This part has its external diameter materially less than the internal diameter of the inner shell of the body 10 and is positioned in concentric relation with said inner shell. It embodies at its lower end an outwardly extending integral flange 29ª in horizontal alignment with the inwardly extending flange 16 at the lower end of the inner ring shaped shell 14 and is rotatably supported by way of a lower ball bearing 30 and an upper ball bearing 31. The lower ball bearing comprises an inner race 32, an outer race 33 and an annular series of balls 34 between the two races. The inner race surrounds the lower end of the sleeve-like part 29 of the countersink tool 11 and rests on the outwardly extending flange 29ª. The outer race 33 of the ball bearing 30 fits snugly within the lower end of the inner shell 14 of the composite tubular body 10 and rests on the inwardly extending flange 16. The upper ball bearing 31 is the same in design as, and is positioned directly above, the lower ball bearing 30 and consists of an inner race 35, an outer race 36 and an annular series of balls 37 between the two last mentioned races. The inner race 35 rests on the inner race 32 of the lower ball bearing. It surrounds the upper end of the sleeve-like part 29 of the countersink tool 11 and is releasably secured in place by means of a split snap type ring 38 which overlies the upper end of the inner race 35 and has its inner margin disposed in an outwardly facing annular groove 39 in the upper end of said sleeve-like part 29. The inner race 36 of the upper ball bearing 31 fits within the central portion of the inner shell 14, as shown in Figure 1. It rests on the inner race 33 of the lower ball bearing and is releasably secured in place by means of a split clip type ring 40 which overlies the upper end of the outer race 36 and has its outer portion disposed in annular inwardly facing groove 41 in the upper portion of the inner shell of the body 10. The two ball bearings 30 and 31 serve to support the countersink tool 11 for rotation about its axis. The downwardly extending flange 29ª on the lower end of the sleeve-like part 29 of the tool embodies a pair of diametrically opposite notches 29ᵇ whereby the tool 11 may be gripped by a wrench or other turning device in connection with assembly of the device. When, in connection with operation of the device, the countersink tool 11 is fed downwards into the upper or outer end of the hole h in the workpiece w the cutting edges 11a form the desired countersink at said outer or upper end of the hole. In order to maintain the countersink tool in centered relation with the hole h during a countersink operation the tool is provided with a centrally disposed depending pilot type cylindrical stem 42. This stem corresponds in diameter to the preformed or previously drilled hole h and has a rounded or substantially hemispherical lower end for guiding it into the hole preliminary to a countersinking operation.

The adaptor 12 is vertically elongated and has the lower end thereof disposed in the upper portion of the inner shell 14 of the composite tubular body 10. The lower end of the adaptor embodies a centrally disposed longitudinally extending internally threaded socket 43 and is provided with an integral outwardly extending flange 44. Such flange embodies diametrically opposite flats 45 in order that the adaptor may be gripped by a wrench in connection with assembly of the device. As shown in Figure 1, the external diameter of the flange 44 is substantially less than the internal diameter of the inner shell 14. The upper end of the adaptor embodies a centrally disposed longitudinally extending internally threaded socket 46 for the externally threaded outer end of the drive shaft s of the motor. When the motor is in operation the drive shaft serves to drive the adaptor and the latter, in turn, operates to drive the countersink tool 11 through the medium of a universal joint 47. In connection with application and removal of the adaptor with respect to the drive shaft of the motor a wrench is applied to the flats 45 on the flange 44 and turned relatively to the motor drive shaft.

The universal joint 47 serves operatively and drivably to connect the adaptor and the countersink tool 11 and consists of a shank 48 and a pair of pivot pins 49 and 50. The shank is vertically elongated and is disposed within the upwardly extending sleeve-like part 29 of the countersink tool 11. The upper end of the shank embodies an externally threaded stem 48ª which fits within the internally threaded socket 43 in the lower end of the adaptor 12 and together with an outwardly extending flange 51 on the upper end of the shank affords a driving connection between the shank and the adaptor. When the stem 48ª is tightened with respect to the socket 43 the flange 51 is clamped against the lower end of the adaptor. The lower end of the shank 48 of the universal joint 47 is disposed within the lower end of the sleeve-like part 29 of the tool 11 and embodies a substantially spherical head 52. Such head is centrally positioned in the lower end of the sleeve-like part 29 and is of slightly less diameter than the inner periphery of said part. It embodies a transversely extending open ended bore 53 and has a transverse slot 54 which extends at right angles to the bore and has the lower portion thereof open. The pivot pin 49 is journalled in the bore 53 and has the ends thereof flared outwards in order that it is held against axial displacement relatively to the head 52. The pivot pin 50 extends at right angles to the pin 49, as shown in Figures 1 and 3, and is of materially less diameter than said pin 49. The central portion of the pin 50 extends across the slot 54 and is journalled in a cylindrical open ended transverse hole 55 in the central portion of the pin 49. The ends of the pin 50 fit within a pair of diametrically opposite holes 56 in the lower end of the sleeve-like part 29 of the countersink tool 11. As shown in the drawings, the central portion of the shank 48 is in spaced relation with the inner periphery of the sleeve-like part 29 of the countersink tool. As the result of the manner in which the universal joint 47 is formed such joint permits the adaptor to swing laterally with respect to the countersink tool 11 while at the same time it maintains a driving connection between the adaptor and the tool. By reason of the fact that the countersink tool is drivably connected to the adaptor by way of the universal joint 47 it is unnecessary for the operator or user, in connection with use of the device, to hold the motor in a position wherein the axis of the drive shaft s is in true axial alignment with the axis of the rotary countersink tool 11. The upper end of the inner shell 14 of the composite tubular body 10 coacts with the outwardly extending flange 44 on the lower end of the adaptor so to limit tilting of the adaptor relatively to the countersink tool as to prevent the adaptor from being laterally spaced to such an extent as to cause the universal joint 47 to bind. In view of the fact that the pivot pins 49 and 50 constituting the articulation members of the universal joint are disposed in the immediate proximity of the cutting edges of the countersink tool 11 the device as a whole is extremely stable when in use and hence effectively and efficiently fulfills its intended purpose.

The tubular combined guide and stop member 13 surrounds the countersink tool 11 and has the upper end thereof slidably mounted in the annular space between the inner and outer shells 14 and 15 of the composite tubular body 10. The lower end of the member 13 is inwardly curved and terminates in an annular series of equidistantly spaced depending fingers 57 having flat lower ends. Preferably there are three fingers 57, although more or less may be employed if desired. In connection with use of the device the pilot type stem 42 is inserted into the hole h and the device is manipulated until the lower ends of the fingers 57 fit flatly against the workpiece w, as shown in Figure 1. Thereafter the motor is started and shifted downwards so as to cause the cutting edges of the tool 11 to feed into the outer or upper end of the hole h. During feed of the edges into the outer end of the hole they serve to cut the desired countersink. In connection with downward shift of the countersink tool 11 the upper end face of the combined guide and stop member 13 strikes against the inwardly extending flange 19 of the upper end of the outer shell 15 and thus precludes further feed of the tool in the direction of the workpiece and serves to control the depth or size of the countersink which is formed by the edges of the tool in the outer or upper end of the hole h. By axially adjusting the outer sleeve 15 with respect to the inner sleeve the depth or size of the countersink may be varied. If it is desired to increase the depth of the countersink the outer shell 15 is adjusted upwards with respect to the inner shell and if it is desired to decrease the depth of the countersink the outer shell is adjusted downwards with respect to the inner shell 14. As heretofore pointed out, axial adjustment of the outer shell with respect to the inner shell is effected by rotating the nut 25. The spiral compression spring 26 serves to urge the combined guide and stop member 13 downwards with respect to the composite tubular body 10. Such spring is located in an annular groove 58 in the upper portion of the outer periphery of the combined guide and stop member 13 and has the upper end thereof in abutment with an annular downwardly facing shoulder 59 on the central portion of the shell 15. The lower end of the spring 26 abuts against the lower end of the annular groove 58 in said upper portion of the outer periphery of the member 13. The pin 21 extends through a slot 13ª in the upper end of the member and serves to limit sliding movement of the member relatively to the body 10.

In addition to the aforementioned parts the countersink device comprises a snap ring 60 which is adapted when in use to surround the fingers 57 of the combined guide and stop member 13 and serves to augment the bearing or contact area thereof so that the fingers, in connection with use of the device, will not enter holes which are immediately adjacent the hole in the workpiece being countersunk. As shown in Figure 1, the ring 60 has at the upper end thereof an inwardly extending rounded bead 61 which is shaped to fit within arcuate grooves 62 in the upper outer corner portions of the fingers 57 and form with such grooves a releasable interlocking connection between the ring 60 and the fingers. When it is desired to use the ring in order to increase or augment the workpiece engaging or contacting area of the fingers the ring is positioned beneath the fingers and is then shifted upwards into surrounding relation with the fingers. In connection with upward shift of the ring the fingers are contracted until the bead 61 is in alignment with the grooves 62. At such time the fingers spring or snap outwards into releasable interfitting relation with the bead of the ring. When it is desired to remove the ring it is urged or forced downwards.

When it is desired to use the device the operator, as heretofore pointed out, inserts the pilot type stem 42 into the hole h in the workpiece w and at the same time manipulates the device so as to cause the lower ends of the fingers 57 of the combined guide and stop member 13 to fit flatly against the workpiece w. After these steps the motor is started so as to effect drive of the tool 11 and shifted downwards so as to cause the cutting edges of the tool to form the desired countersink in the outer end of the hole h. When the tool is fed downwards to a predetermined depth the upper end of the member 13 strikes against the inwardly extending flange 19 at the upper end of the outer shell 15 and stops further downward feed of the countersink tool with respect to the workpiece. As soon as downward feed of the countersink tool is arrested the motor is stopped and the device is shifted away from the workpiece.

The herein described countersink device effectively and efficiently fulfills its intended purpose and may be manufactured or produced at a low cost. It is essentially in the form of a small sized self-contained unit and is characterized by the fact that the universal joint 47 between the adaptor 12 and the rotary countersink tool 11 makes it unnecessary for the operator in connection with use of the device to hold the motor in a position wherein the drive shaft is in true axial alignment with the countersink tool. The device is further characterized by the fact that the composite tubular body 10 has a twofold purpose in that it serves slidably to support the combined guide and stop member 13 and also so limits tilting of the adaptor relatively to the countersink tool that the adaptor is prevented from being laterally displaced to such an extent as to cause the universal joint between the adaptor and the tool to bind. Because the device includes the universal joint it serves to form uniform and extremely accurate countersinks even though it is manipulated by an unskilled operator. By reason of the fact that the pins 49 and 50 of the universal joint are disposed in the immediate vicinity of the cutting edges of the countersink tool 11, i. e., adjacent the lower end of the composite tubular body 10, the device, in connection with use thereof, is inherently stable and hence may be used with facility and by an unskilled or semi-skilled user.

Whereas the device has been described as a countersink device it is to be understood that by changing the form or type of tool it may be used in other capacities or for other purposes. It is also to be understood that the invention is not to be restricted to the details set forth since these may be modified within the scope of the appended claims without departing from the spirit and scope of the invention.

Having thus described the invention what we claim as new and desire to secure by Letters Patent is:

1. A tool device adapted to be actuated by a power driven shaft and comprising a ring shaped body, a tool positioned adjacent one end of, and in axial alignment with, the body and mounted for rotation on a fixed axis relatively to said body, a rotatable adaptor disposed adjacent the other end of the body, provided with means for connection to the shaft, and so proportioned with respect to width and also so positioned that it has lateral clearance about it in all directions, and a universal joint within the body extending between, and serving drivably to connect, the opposed portions of the adaptor and tool, adapted to permit the shaft and adaptor to swing laterally relatively to the tool and body and embodying articulation members adjacent said one end of the body and in close proximity to the operating portion of the tool.

2. A tool device adapted to be driven by a power driven shaft and comprising a tubular body, a tool positioned adjacent one end of, and in axial alignment with, the body and mounted for rotation on a fixed axis relatively to said body, an elongated rotatable adaptor having one end thereof disposed within the other end of the body and its other end positioned exteriorly of the body and provided with means for connection to the shaft, and having its said one end so proportioned with respect to width and also so positioned that the adaptor as a whole has lateral clearance about it in all directions, and a universal joint in the body extending between, and serving drivably to connect, the opposed portions of the adaptor and tool, adapted to permit the shaft and adaptor to swing laterally relatively to the tool and body, and embodying crossed articulation pins adjacent said one end of the body and in the immediate vicinity of the operating portion of the tool.

3. A countersink device adapted to be driven by a power driven shaft and comprising a tubular body, a countersink tool positioned adjacent one end of the body and mounted for rotation relatively to said body, an elongated rotatable adaptor having one end thereof positioned adjacent the other end of the body and its other end provided with means for connection to the shaft, and having its said one end so proportioned with respect to width and also so positioned that the adaptor as a whole has lateral clearance about it in all directions, and a universal joint within the body extending between, and serving drivably to connect, the opposed ends of the adaptor and countersink tool and adapted to permit the shaft and adaptor to swing laterally relatively to the countersink tool and body.

4. A countersink device adapted to be driven by a motor driven shaft and comprising a ring shaped body, a countersink tool positioned adjacent one end of, and in axial alignment with the body, and mounted for rotation on a fixed axis relatively to said body, an elongated rotatable adaptor having one end thereof disposed within the other end of the body and its other end positioned exteriorly of the body and provided with means for connection to the shaft, and having its said one end so proportioned with respect to width and also so positioned that the adaptor as a whole has lateral clearance about it in all directions, and a universal joint within the body extending between, and serving drivably to connect, the opposed ends of the adaptor and countersink tool, adapted to permit the shaft and adaptor to swing laterally relatively to the countersink tool and body, and embodying articulation members adjacent said one end of the body and in close proximity to the operating portion of the tool.

5. A tool device adapted to be actuated by a motor driven shaft and comprising a composite tubular body consisting of an inner ring shaped shell and an outer ring shaped shell extending around and in concentric relation with the inner shell and having one end thereof spaced from the adjacent end of said inner shell so as to form an annular space therebetween, a tool positioned adjacent said adjacent end of, and in axial alignment with, the inner shell and mounted for rotation relatively to the body, an elongated rotatable adaptor having one end thereof disposed adjacent the other end of the body and its other end positioned exteriorly of the body and provided with means for connection to the shaft, a universal joint within the body extending between and serving drivably to connect the opposed ends of the adaptor and tool, adapted to permit the shaft and adaptor to swing laterally relatively to the tool and body, and embodying articulation members opposite said adjacent end of the inner shell and in close proximity to the operating portion of the tool, and a tubular spring loaded combined guide and stop member extending around the countersink tool and having one end thereof slidably mounted in said annular space.

6. A countersink device adapted to be driven by a motor driven shaft and comprising a composite tubular body consisting of an inner ring shaped shell and an outer ring shaped shell extending around and in concentric relation with the inner shell and having one end thereof spaced from the adjacent end of said inner shell so as to form an annular space therebetween, a countersink tool positioned adjacent said adjacent end of, and in axial alignment with, the inner shell and mounted for rotation relatively to the body, an elongated rotatable adaptor having one end thereof disposed within the other end of the body and its other end positioned exteriorly of the body and provided with means for connection to the shaft, a universal joint within the body extending between, and serving drivably to connect, the opposed ends of the adaptor and countersink tool, and adapted to permit the shaft and adaptor to swing laterally relatively to the countersink tool, and a tubular spring loaded combined guide and stop member extending around the countersink tool and having one end thereof slidably mounted in said annular space.

7. A tool device adapted to be driven by a motor driven shaft and comprising a ring shaped body, a tool positioned adjacent one end of, and in axial alignment with, the body, a ball bearing arranged to support the tool for rotation relatively to the body and embodying an outer race secured fixedly within said one end of the body, an elongated rotatable adaptor having one end thereof disposed adjacent the other end of the body and its other end provided with means for connection to the shaft, and having its said one end so proportioned with respect to width and also so positioned that the adaptor as a whole has lateral clearance about it in all directions, and a universal joint within the body extending between, and serving drivably to connect, the opposed ends of the adaptor and tool and adapted to permit the shaft and adaptor to swing laterally relatively to said tool and body.

8. A countersink device adapted to be driven by a motor driven shaft and comprising a ring shaped body having at one end thereof an inwardly extending annular flange, a tool positioned adjacent said one end of, and in axial alignment with, the body, a ball bearing adapted to support the tool for rotation relatively to the body and embodying an outer race mounted fixedly within said one end of the body and arranged in abutment with the flange, an elongated rotatable adaptor having one end thereof disposed within the other end of the body and its other end positioned exteriorly of the body and provided with means for connection to the shaft, and having its said one end so proportioned with respect to width and also so positioned that the adaptor as a whole has lateral clearance about it in all directions, and a universal joint within the body extending between, and serving drivably to connect, the opposed ends of the adaptor and tool and adapted to permit the shaft and adaptor to swing laterally relatively to said tool and body.

9. A tool device adapted to be driven by a motor driven shaft and comprising a ring shaped body, a tool positioned adjacent one end of, and in axial alignment with, the body, a ball bearing arranged to support the tool for rotation relatively to the body and embodying an outer race secured fixedly within said one end of the body, an elongated rotatable adaptor having one end thereof disposed adjacent the other end of the body and its other end provided with means for connection to the shaft, and having its said one end so proportioned with respect to width and also so positioned that the adaptor as a whole has lateral clearance about it in all directions, and a universal joint within the body extending between, and serving drivably to connect, the opposed ends of the adaptor and tool, adapted to permit the shaft and adaptor to swing laterally relatively to said tool and body, and embodying coacting articulation members adjacent said one end of the body and in close proximity to the operating portion of the tool.

10. A countersink device adapted to be driven by a motor driven shaft and comprising a ring shaped body having at one end thereof an inwardly extending annular flange, a countersink tool positioned adjacent said one end of, and in axial alignment with, the body, a ball bearing adapted to support the tool for rotation relatively to the body and embodying an outer race mounted fixedly within said one end of the body and arranged in abutment with the flange, an elongated rotatable adaptor having one end thereof disposed within the other end of the body and its other end positioned exteriorly of the body and provided with means for connection to the shaft, and a universal joint within the body extending between, and serving drivably to connect, the opposed ends of the adaptor and tool, adapted to permit the shaft and adaptor to swing laterally relatively to said tool and body, and embodying a pair of crossed articulation pins adjacent said one end of the body and in the immediate vicinity of the cutting edges of the tool.

11. A tool adapted to be actuated by a power driven shaft and comprising a ring shaped body, a tool positioned adjacent one end of, and in axial alignment with, the body and having at its inner end a sleeve-like part mounted in, and for rotation relatively to, said body, a rotatable adaptor disposed adjacent the other end of the body and provided with means for connection to the shaft, and a universal joint extending between, and serving drivably to connect the adaptor and tool, adapted to permit the shaft and adaptor to swing relatively to the tool and body, and embodying a shank disposed within, and extending longitudinally of, the sleeve-like part of the tool and having one end thereof connected to the adaptor, and a pair of coacting articulation members extending between the other end of the shank and said sleeve-like part, and positioned adjacent said one end of the body and in close proximity to the operating portion of the tool.

12. A tool adapted to be driven by a motor driven shaft and comprising a ring shaped body, a tool positioned adjacent one end of, and in axial alignment with, the body and having at its inner end a sleeve-like part mounted in, and for rotation relatively to, said body, a rotatable adaptor disposed adjacent the other end of the body and provided with means for connection to the shaft, and a universal joint extending between, and serving drivably to connect, the adaptor and tool, adapted to permit the shaft and adaptor to swing relatively to the tool and body, and embodying a shank disposed loosely within, and extending longitudinally of, the sleeve-like part of the tool, having one end thereof connected to the adaptor and its other end provided with a substantially spherical head with a longitudinally extending cross slot therein, a pin journaled in the head and extending transversely across the slot, and a second pin extending at right angles to the first mentioned pin and having the central portion thereof disposed in the slot and journaled in a hole in the central portion of said first mentioned pin and its ends mounted in diametrically opposite holes in the adjacent portion of said sleeve-like part.

13. A tool adapted to be actuated by a power driven shaft and comprising a ring shaped body, a rotary tool positioned adjacent one end of, and in axial alignment with, the body and having at its inner end a sleeve-like part of less diameter than the body disposed centrally within, and extending longitudinally of, said body, a ball bearing arranged to support the tool for rotation relatively to the body and embodying an outer race secured fixedly within said one end of the body and an inner race extending around said sleeve-like part, an elongated rotatable adaptor having one end thereof disposed adjacent the other end of the body and its other end provided with means for connection to the shaft, and a universal joint within the sleeve-like part extending between, and serving drivably to connect, said one end of the adaptor and the sleeve-like part and adapted to permit the shaft and adaptor to swing laterally relatively to the tool and body.

14. A tool adapted to be actuated by a power driven shaft and comprising a ring shaped body, a rotary tool positioned adjacent one end of, and in axial alignment with, the body and having at its inner end a sleeve-like part of less diameter than the body disposed centrally within, and extending longitudinally of, said body, a ball bearing arranged to support the tool for rotation relatively to the body and embodying an outer race secured fixedly within said one end of the body and an inner race extending around said sleeve-like part, an elongated rotatable adaptor having one end thereof disposed adjacent the other end of the body and its other end provided with means for connection to the shaft, and a universal joint extending between, and serving drivably to connect the adaptor and tool, adapted to permit the shaft and adaptor to swing relatively to the tool and body, and embodying a shank disposed within, and extending longitudinally of, the sleeve-like part of the tool and having one end thereof connected to the adaptor, and a pair of coacting articulation members extending between the other end of the shank and said sleeve-like part and positioned adjacent said one end of the body and in close proximity to the operating portion of the tool.

15. A tool device adapted to be actuated by a motor driven shaft and comprising a composite tubular body embodying an inner ring shaped shell having at one end thereof an externally threaded outwardly extending flange, and an outer ring shaped shell extending around, and in concentric relation with the inner shell, having one end thereof spaced from the other end of the inner shell to form an annular space therebetween and its other end provided with an inwardly extending flange disposed inwards of said outwardly extending flange and in sliding engagement with said inner shell and having teeth in opposed relation with said inwardly extending flange, and embodying means between it and said inner shell for permitting it to slide longitudinally to a limited extent relatively to said inner shell while at the same time preventing it from rotating with respect to the inner shell, an internally threaded nut mounted rotatably on the external thread of the outwardly extending flange and adapted when turned in one direction relatively to the inner shell to adjust the outer shell axially in one direction and when turned in the other direction relatively to the inner shell to adjust the outer shell axially in the other direction, and having teeth arranged normally to interfit with the teeth of the inwardly extending flange of the outer shell and adapted when said outer shell is shifted longitudinally away from the nut to disengage the last mentioned teeth and free the nut for turning, a tool positioned adjacent said other end of, and in axial alignment with, the inner shell, mounted for rotation relatively to the body, a rotatable adaptor disposed adjacent said one end of the inner shell and provided with means for connection to the shaft, a driving connection in the body between the opposed portions of the adaptor and tool, and a tubular combined guide and stop member extending around the tool, having one end thereof slidably mounted in said annular space and adapted in connection with sliding of the member in the direction of the body to abut against the inwardly extending flange of the outer shell, and provided with means between it and the body for limiting longitudinal sliding movement thereof in both directions, and a compression spring disposed between the member and said outer shell and arranged to urge the outer shell towards the nut and the member away from the body.

16. A tool device adapted to be actuated by a motor driven shaft and comprising a tubular body, a tool positioned adjacent one end of, and in axial alignment with, the body and mounted for rotation relatively to said body, a rotatable adaptor disposed adjacent the other end of the body and having one end thereof provided with means for connection to the shaft and its other end connected to drive the tool, a tubular spring-loaded combined guide and stop member extending around the tool and having the inner end thereof connected slidably to said one end of the body and its other end provided with a plurality or series of spaced apart workpiece engaging fingers, and a workpiece engaging ring extending around and removably connected to said fingers.

17. A tool device adapted to be actuated by a motor driven shaft and comprising a tubular body, a tool positioned adjacent one end of, and in axial alignment with, the body and mounted for rotation relatively to said body, a rotatable adaptor disposed adjacent the other end of the body and having one end thereof provided with means for connection to the shaft and its other end connected to drive the tool, a tubular spring-loaded combined guide and stop member extending round the tool and having the inner end thereof connected slidably to said one end of the body and provided at its other end with a continuous series of spaced apart workpiece engaging fingers, and a workpiece engaging snap type ring extending around the fingers and releasably connected thereto by an interfitting connection.

JOSEPH M. GWINN, Jr.
CHRISTIAN L. R. SMELTZER.